United States Patent
Meier et al.

(10) Patent No.: US 12,529,189 B2
(45) Date of Patent: Jan. 20, 2026

(54) METHOD AND DEVICE FOR DETECTING A WEB BREAK OF A FIBROUS WEB, INDUSTRIAL PLANT AND COMPUTER PROGRAM PRODUCT

(71) Applicant: Siemens Energy Global GmbH & Co. KG, Bayern (DE)

(72) Inventors: Stefan Ingo Meier, Marloffstein (DE); Steffen Hofmann, Erlangen (DE); Jürgen Mielke, Bamberg (DE)

(73) Assignee: Siemens Energy Global GmbH & Co. KG, Bayern (DE)

(*) Notice: Subject to any disclaimer, the term of this patent is extended or adjusted under 35 U.S.C. 154(b) by 974 days.

(21) Appl. No.: 17/432,516

(22) PCT Filed: Feb. 12, 2020

(86) PCT No.: PCT/EP2020/053550
§ 371 (c)(1),
(2) Date: Aug. 20, 2021

(87) PCT Pub. No.: WO2020/173701
PCT Pub. Date: Sep. 3, 2020

(65) Prior Publication Data
US 2022/0145539 A1    May 12, 2022

(30) Foreign Application Priority Data
Feb. 25, 2019   (EP) ..................................... 19159046

(51) Int. Cl.
*D21F 7/04*        (2006.01)
*D21G 9/00*        (2006.01)
(52) U.S. Cl.
CPC ............. *D21F 7/04* (2013.01); *D21G 9/0009* (2013.01)

(58) Field of Classification Search
CPC ............................... D21F 7/04; D21G 9/0009
See application file for complete search history.

(56) References Cited

U.S. PATENT DOCUMENTS

| 6,463,170 B1 | 10/2002 | Toivonen et al. |
| 10,246,826 B2 | 4/2019 | Meier |
| (Continued) | | |

FOREIGN PATENT DOCUMENTS

| CN | 1088647 A | 6/1994 |
| CN | 102301069 A | 12/2011 |
| (Continued) | | |

OTHER PUBLICATIONS

PCT International Search Report and Written Opinion of International Searching Authority mailed Apr. 21, 2020 corresponding to PCT International Application No. PCT/EP2020/053550 filed Dec. 2, 2020.

*Primary Examiner* — Jacob T Minskey
*Assistant Examiner* — Stephen M Russell
(74) *Attorney, Agent, or Firm* — Wolter Van Dyke Davis, PLLC (57) ABSTRACT

A method for monitoring an industrial plant. In a first part of the industrial plant, first parameters are provided. The industrial plant is used to produce and/or process a fibrous material web. Second parameters are provided in a second part. The parameters are stored, preferentially as time series. In the case of a web break in the second part, the second parameters are first analyzed for a second anomaly. If no second anomaly can be detected, the first parameters are analyzed for a first anomaly. During the analysis, the parameters which were stored in a time range before the web break are preferably examined. If a first or second anomaly is detected, these, and optionally measures to avoid such web breaks, are displayed to the user. Optionally, the first param- (Continued)

eters and/or the second parameters can be set so as to avoid future web breaks.

15 Claims, 3 Drawing Sheets

(56) References Cited

U.S. PATENT DOCUMENTS

| | | | |
|---|---|---|---|
| 2002/0038197 A1* | 3/2002 | Chen | D21F 7/04 |
| | | | 702/182 |
| 2006/0070713 A1 | 4/2006 | Wanke | |
| 2006/0096726 A1* | 5/2006 | Ahvenainen | D21G 9/0063 |
| | | | 162/263 |
| 2007/0045461 A1 | 3/2007 | Sartain | |
| 2015/0001270 A1 | 1/2015 | Merkel | |
| 2015/0292163 A1* | 10/2015 | Bomstad | D21H 27/005 |
| | | | 700/125 |

FOREIGN PATENT DOCUMENTS

| | | |
|---|---|---|
| CN | 102448859 A | 5/2012 |
| CN | 107780285 A | 3/2018 |
| DE | 102006011201 A1 | 9/2007 |
| DE | 112007002607 T5 | 12/2009 |
| DE | 102009006827 A1 | 8/2010 |
| EP | 1031658 A2 | 8/2000 |
| IN | 104136350 A | 11/2014 |
| JP | 2005299028 A | 10/2005 |
| WO | 03095348 A1 | 11/2003 |
| WO | 2008059105 A1 | 5/2008 |

* cited by examiner

METHOD AND DEVICE FOR DETECTING A WEB BREAK OF A FIBROUS WEB, INDUSTRIAL PLANT AND COMPUTER PROGRAM PRODUCT

CROSS REFERENCE TO RELATED APPLICATIONS

This application is the US National Stage of International Application No. PCT/EP2020/053550 filed 12 Feb. 2020, and claims the benefit thereof. The International Application claims the benefit of European Application No. EP19159046 filed 25 Feb. 2019. All of the applications are incorporated by reference herein in their entirety.

FIELD OF INVENTION

The invention relates to a method and a device for detecting a web break of a fibrous web. The invention furthermore relates to a computer program product and an industrial plant.

BACKGROUND OF INVENTION

An industrial plant for producing a fibrous material web is in particular a paper machine. A paper machine comprises a first part, the wet part, and a second part, the dry section.

In the wet part, a fibrous solution or suspension is sprayed onto a wire. The layer thus formed is pressed with the aid of a press section and is fed by means of a transport belt to a dry section. The dry section serves in particular for drying the fibrous material web provided from the wet part. During the drying and subsequent winding-up of the fibrous material web, web breaks of the fibrous material web occasionally occur.

Web breaks generally lead to a shutdown of a paper machine. Such a shutdown disadvantageously costs the operator of the paper machine a large amount of money.

SUMMARY OF INVENTION

It is therefore an object of the invention to as far as possible avoid shutdowns of an industrial plant.

In particular, it is an object of the invention to avoid impending web breaks.

It is furthermore an aspect of the invention to identify a possible cause in the event of a web break.

The object is achieved by means of a method, a device, a computer program product, and an industrial plant as claimed.

The dependent claims relate to advantageous embodiments and further developments of the invention.

The invention is based on the insight that a web break occurs predominantly in the second part of the industrial plant, in particular in the dry section.

In general, a malfunction of a drive leads to a locally elevated web tension of the material web and thus possibly to a web break of the fibrous material web in the second part of the industrial plant.

Alternatively or in addition, malfunctions in the first part of the industrial plant, in particular in the wet part, can at least promote a web break of the fibrous material web.

It is advantageously the case that first parameters are determined with the aid of sensors and/or encoders in the first part of the industrial plant and are stored. It is furthermore advantageously the case that second parameters are determined with the aid of sensors and/or encoders in the second part of the industrial plant and are stored. Storage is advantageously performed in each case in the form of a time series. The time series or the first and/or second parameters are advantageously stored on a data memory of a processing unit or in a cloud.

Storage of the first parameters and of the second parameters is advantageously performed as a function of the time, in particular in the form of time series. The time series are advantageously characterized by timestamps, advantageously by the time of day of the determination.

It is advantageously the case that time series composed of first parameters are inspected for a first anomaly and time series composed of second parameters are inspected for a second anomaly.

An analysis of the respective first parameters and/or of the respective second parameters is performed advantageously on the basis of the first or second parameters that have already been stored. Advantageously, those parameters which have been recorded in a time range preceding the web break are inspected. Such a time range may be between one minute and one hour in length.

In the event of the web break, it is thus advantageously the case that recordings of rotational speeds and torques of the drive are analyzed for a second anomaly. The analysis is advantageously performed through the calculation of the web tension, for example by means of rotational speed differences of individual drives. If a second anomaly is observed, a user can ascertain the reason for the web break and, if necessary, adapt the second parameters for the corresponding drives.

Such an adaptation advantageously occurs automatically. An adaptation is advantageously performed such that open-loop or closed-loop control of the drives is modified such that high web tensions of the fibrous material web are avoided.

If no malfunction of a drive can be observed in an analysis of the rotational speeds and/or of the torques, then it would appear that a malfunction is present in the wet part of the paper machine. In this case, an analysis of the first parameters ascertained there is performed.

Possible first parameters are a temperature of a fibrous solution, a concentration of the fibers in the solution, concentrations of additives or a pH value of the respective solution. Furthermore, a first parameter may be a state of a nozzle, a pressure in the feed line of the solution to the nozzle, and/or the fluctuation thereof.

Possible second parameters are a rotational speed and/or a torque of the respective drive. Furthermore, a thickness of the fibrous material web can be a second parameter. Furthermore, settings of a closed-loop controller, for example an I component, a P component and/or a D component of a PID controller can be first or second parameters. Finally, a measured web tension at a specifiable position in the second part can be a second parameter.

With the aid of algorithms that are advantageously based on artificial intelligence, it is possible to detect anomalies in the form of a pattern in the respective time series. An anomaly can thus indicate a weak point in the fibrous material web that is provided from the first part of the industrial plant.

In the event of such a first anomaly being detected in the first part of the industrial plant, the second parameters in the second part of the industrial plant can be set such that a web break of the supposedly faulty fibrous material web is avoided.

In the method for monitoring an industrial plant for a web break of a fibrous material web, the industrial plant serves for producing and/or processing the fibrous material web, wherein the industrial plant comprises a first part, in particular a wet part, and a second part, in particular a dry section, wherein the method comprises the following steps:—determining and storing first parameters of the first part and second parameters of the second part,—analyzing the second parameters for a second anomaly,—if it is observed that no second anomaly is present in the second parameters, an analysis of the first parameters for a first anomaly is performed;—if the first anomaly is observed in the first parameters, the first anomaly is displayed to a user.

An anomaly is to be understood advantageously to mean a deviation of the respective parameter beyond a specified tolerance. An anomaly may furthermore be understood to mean a change in a difference of in each case two parameters. Finally, a rapid increase of the respective first and/or of the respective second parameter may be an anomaly.

A fibrous material web is in particular a paper web or a cardboard web. The fibers are in particular pulp fibers.

In a first part of the industrial plant, the fibrous material web is provided advantageously by virtue of a fibrous solution being sprayed onto a wire. The fibers situated on the wire are advantageously processed further with the aid of a press section. The wire is advantageously configured as a transport belt.

The fibrous material web is advantageously provided to the second part of the industrial plant from the first part of the industrial plant.

In the second part of the industrial plant, the fibrous material web is processed further. In particular, drying of the fibrous material web is performed, wherein the second part of the industrial plant is configured as a dry section. The second part may also comprise further components such as a winder.

The fibrous material web is, in the second part of the industrial plant, guided over rollers and dried with the aid of the rollers. The respective roller is connected to a drive and is driven by the drive. The respective drive is operated with a rotational speed and a torque. The rotational speed and/or the torque of the respective drive may each be determined and stored as second parameters. The rotational speed of the respective drive may be ascertained with the aid of an encoder, wherein the encoder is assigned to the respective drive. The torque may be ascertained with the aid of a current sensor, wherein the current sensor is assigned to the respective encoder.

Second parameters are in particular the respective rotational speed and/or the respective torque of the respective drive. Furthermore, a second parameter may be a web tension of the fibrous material web between two rollers, wherein the respective roller is linked to the respective drive.

The respective first and/or second parameter is advantageously stored in a data memory of a processing unit. It is advantageous for the respective first and/or second parameter to be stored as a function of the time, in particular in the form of a time series.

It is advantageously furthermore the case that a chronological course of the respective first and/or second parameter is displayed. It is advantageously also possible for the difference or the sum of individual first and/or second parameters to be displayed and/or stored.

In the event of a web break, it may be analyzed whether an elevated web tension of the fibrous material web between two rollers has occurred. The web tension can be ascertained by means of a difference of rotational speeds of adjacent rollers.

A reason for a web break may be a defective bearing of the respective roller or an incorrectly set closed-loop control device. Furthermore, contamination of a roller can lead to a web break. A contamination of the respective roller may also be a second parameter.

In the event of an elevated web tension in the region in which the web break has occurred, a further analysis can ascertain the cause of the anomaly. Furthermore, the controller of the respective drive can be set for the further operation such that the risk of a web break is minimized.

By contrast, if no second anomaly is observed in the event of a web break, then such a result is advantageously stored and/or displayed to the user.

A further analysis of the first parameters for a first anomaly is advantageously performed.

First parameters advantageously relate to and/or describe the processes in the first part of the industrial plant.

By way of example, the first parameters serve for describing a wet part of a paper machine.

A first anomaly may be an elevated temperature of the fibrous solution, an unusual fiber orientation on the wire section, an at least partially blocked nozzle, or an incorrectly functioning pump. A first anomaly may be identified from a deviation of a respective first parameter beyond a tolerance threshold for the respective first parameter. Furthermore, a first anomaly may be a disadvantageous fiber orientation or a disadvantageous fiber distribution in the fibrous material web.

If a first anomaly is observed, the first anomaly may be displayed to the user. During maintenance of the second part of the industrial plant, where the web break occurred, a possible fault source can be ascertained proceeding from the analysis based on the first parameters, and the fault can be eliminated.

Furthermore, with the aid of a controller of the first part of the industrial plant, it can be sought to avoid the respective anomaly. By way of example, closed-loop control of the pressure or of the temperature of the fibrous solution can be adapted.

Complete monitoring of the industrial plant is advantageously possible by means of the invention. At present, in the event of a web break, it is generally the case that only the second part of the industrial plant is inspected. By means of the invention, it is also possible for the first part to be inspected, and thus for a malfunction spanning the entire industrial plant to be identified. The avoidance of such malfunctions leads to an avoidance of web breaks and accordingly to improved operating stability of the industrial plant.

In one advantageous embodiment of the invention, an analysis of the first parameters and/or of the second parameters for a web break is performed.

A web break is in particular a tear in the fibrous material web. Such a web break often occurs in the second part of the industrial plant.

The analysis of the first and/or second parameters is advantageously performed for a time range preceding the web break.

An analysis of the first and/or second parameters is advantageously performed after a web break in order to identify which deviations could have led to the web break.

In one advantageous embodiment of the invention, if a first anomaly or second anomaly of the second parameters is observed, a change of the second parameters is performed such that a web tension of the fibrous material web is reduced.

The advantageous embodiments of the invention are configured in particular as operating methods, in particular as operating methods of a paper machine.

An operating method is distinguished in particular by an intervention into the operating procedure of the industrial plant, wherein a method for monitoring merely detects and/or displays a malfunction.

It is advantageously the case that, if a first anomaly or a second anomaly is observed, the respective drive is controlled in open-loop or closed-loop fashion such that the web tension of the fibrous material web is reduced at least in certain regions.

It is advantageously possible that, if a second anomaly is observed, the second parameters are set such that a web break of the fibrous material web in the second part is avoided in future. With this embodiment, allowance is made for the knowledge that changes in the first part of the industrial plant take effect in the second part of the plant only at a later point in time.

It is advantageously possible that, if the second anomaly is present, an inspection of the first parameters for a first anomaly is performed.

It is furthermore particularly advantageously possible for the processes in the first part of the industrial plant to be adapted such that a web break is less likely. For example, the application of material may be increased for a certain time in order to increase the stability of the fibrous material web.

By means of a change of the second parameters, it is advantageously possible to avoid another web break, in particular if the quality of the fibrous material web provided from the first part of the industrial plant cannot be provided with a higher stability immediately.

In a further advantageous embodiment of the invention, if a first anomaly of the first parameters is observed, a change of the first parameters is performed such that a maximum tension assumes a sufficiently high value such that no web break occurs in the case of correct functioning of the second part.

A change of the first parameters is advantageously performed such that the fibrous material web is reinforced. The reinforcement of the fibrous material web may be maintained until such time as a first and/or second anomaly no longer arises.

The maximum tension is advantageously the web tension that the fibrous material web withstands without a web break occurring.

The maximum tension may be ascertained experimentally and stored. The maximum tension is generally dependent on the nature and embodiment of the fibrous material web. Accordingly, it is advantageously the case that the nature and embodiment of the fibrous material web are detected, and the maximum tension for the observation of the anomaly is correspondingly provided.

At least a repetition of the web tension can be effectively avoided by means of an adaptation of the first parameters.

In particular, such a measure is advantageous until intended maintenance of the first part of the industrial plant is performed, because already planned maintenance does not have to be scheduled earlier in order to avoid a web break.

In a further advantageous embodiment of the invention, the analysis of the second parameters comprises the following steps:—calculating the web tension of the material web from the second parameters,—comparing the web tension with a maximum tension,—wherein the second anomaly is present if the web tension overshoots the maximum tension.

The web tension may be calculated from a difference of in each case two torques and/or two rotational speeds of adjacent drives.

Furthermore, the web tension may be determined directly by means of a web tension sensor.

Alternatively or in addition, the web tension may take place by applying a vibration and determining the respective natural frequency of the vibration.

The web tensions observed between in each case multiple drives during the operation of the industrial plant are advantageously stored. Storage is advantageously performed as a time series or as a function of the time. The web tension is advantageously a second parameter.

A comparison of the calculated and/or measured web tension with the maximum tension is advantageously performed with the aid of a processing unit and/or a control device.

In a further advantageous embodiment of the invention, the maximum tension is calculated on the basis of the first parameters.

The maximum tension is generally dependent on the properties of the fibrous material web. The maximum tension can therefore be calculated from the first parameters in particular with the aid of a semiempirical model. Experimentally ascertained factors can assist the calculation.

The maximum tension is advantageously used for the decision as regards whether a second anomaly is present in the second parameters.

Through the calculation of the maximum tension on the basis of the first parameters, it can advantageously be detected whether a second anomaly has led to the web break of the fibrous material web.

A particularly reliable determination of the second anomaly is possible through the calculation of the maximum tension from the first parameters.

In a further advantageous embodiment of the invention, first parameters are in particular: —a temperature, a chemical composition of a fibrous solution, an averaged orientation of the fibers with respect to one another, wherein the second parameters are in particular: —a temperature of the fibrous material web, a measured web tension, a torque of a respective drive, a rotational speed of the respective drive.

The web tension is advantageously ascertained with the aid of a sensor, in particular a tension load cell.

Through the assignment of first parameters for the first part of the industrial plant and second parameters for the second part of the industrial plant, the evaluation and/or the identification of an anomaly are/is possible in a particularly efficient manner.

In a further advantageous embodiment of the invention, the respective first parameter and/or the respective second parameter is stored as a time series.

A time series is advantageously the chronological course of the respective parameter as a function of the time.

The time of day is advantageously selected as the time.

It is advantageously the case that the time series are synchronized by way of timestamps. The timestamps are advantageously defined by the time of day.

As a result of the parameters being stored as time series, a comparison of parameters with one another is possible in a straightforward and reliable manner.

In a further advantageous embodiment of the invention, the at least respective first parameter and/or the at least one respective second parameter are stored as a function of the time, wherein the respective first parameters and/or the respective second parameters are analyzed with the aid of an algorithm based on artificial intelligence.

The first parameters and/or second parameters are advantageously stored in the form of a time series or as a function of the time. The time is to be understood in particular to mean the operating time of the industrial plant.

An analysis of the first and/or second parameters as a function of the time may also take into consideration a change of the respective parameter over time.

An analysis is advantageously performed with a suitable algorithm, in particular a monitored or unmonitored algorithm with learning capability.

In a further advantageous embodiment of the invention, if the first anomaly and/or the second anomaly is observed, a possibility for avoiding the respective anomaly is displayed.

The display is advantageously output to the user. For example, if a blocked nozzle is detected, it may be proposed that the pressure briefly be increased and/or that the temperature of the fibrous solution be increased.

Furthermore, in the case of a high web tension, a web break of the fibrous material web can be avoided automatically through adaptation of the respective rotational speed and/or of the respective torque of the respective drive.

In a further advantageous embodiment of the invention, the first parameters and/or the second parameters are stored in a data memory, in particular a cloud, in each case as a function of the time.

Storage is advantageously performed in the form of time series, wherein the time series can advantageously be set in relation to one another by way of common timestamps.

The time of day, for example, may serve as a timestamp.

The first parameters and/or the second parameters are advantageously storable on a peripheral server, in particular in a cloud.

The analysis of the presence of a first and/or second anomaly is advantageously performed by means of the processing unit, wherein the processing unit is advantageously connected to the cloud.

The calculation as regards whether a first anomaly or a second anomaly is present is advantageously performed with the aid of a computer program which is executed on the processing unit.

The storage of the first parameters and of the second parameters in a cloud has the advantage that the processing capacity that is generally required for the open-loop and closed-loop control of the industrial plant is not depleted.

In a further advantageous embodiment of the invention, the stored first parameters and/or the stored second parameters serve for the adaptation of the algorithm that is based on artificial intelligence.

An adaptation of the algorithm is to be understood in particular to mean teaching of a neural network or of some other algorithm.

It is preferable for data from time ranges detected shortly prior to a web break to be used for the adaptation of the algorithm.

In this example, too, the use of algorithms with learning capability is advantageous. For example, the use of a random-tree-based algorithm is advantageous.

In a further advantageous embodiment of the invention, in the event of a web break, the first parameters and/or the second parameters that lie in a time range preceding the web break are analyzed in order to identify a pattern, wherein, in the event of a later occurrence of such a pattern, a warning signal is output to the user.

A pattern may be a typical deviation in a parameter from an average value or a rapid increase of a difference of two second parameters.

A computer program product for carrying out a method according to any one of the preceding claims when the computer program product is executed on a processing unit.

The computer program is advantageously configured as an application (app) for execution on a peripheral server.

The computer program is advantageously stored on a computer-readable medium. The computer program product is advantageously loaded into the working memory of a processing unit and executed from there by at least one CPU.

The computer program product is advantageously executed on a peripheral server. The computer program product is advantageously executed in the cloud.

The device for monitoring an industrial plant comprises:—an interface for receiving first parameters and/or second parameters, —a processing unit for analyzing first parameters for a first anomaly and/or second parameters for a second anomaly, optionally a display for interaction with a user, and an interface for the provision of settings for the industrial plant, wherein the device is configured for carrying out a method described here.

The device is advantageously connected to at least one sensor and/or at least one encoder. The respective sensor and/or the respective encoder advantageously serve(s) for providing first parameters or second parameters.

The device advantageously furnishes the respectively provided first or second parameter with a timestamp and stores the first and/or second parameter.

The device is advantageously connected to a data memory.

The industrial plant is configured in particular as a paper machine. The industrial plant comprises a device according to the statements above.

In the industrial plant, the first part is advantageously configured as a wet part. The wet part advantageously comprises a wire section and a press section. The wet part furthermore comprises a device for providing and/or for applying a fibrous solution to the wire section.

The second part of the industrial plant is advantageously configured as a dry section. The dry section advantageously serves for drying the fibrous material web that has been provided from the first part of the industrial plant.

The dry section advantageously comprises a multiplicity of rollers over which the fibrous material web is guided. The rollers are generally heated and serve for drying the fibrous material web.

The respective roller can be driven by means of a drive. The respective drive has a respective rotational speed and a respective torque during operation.

The torque and/or the rotational speed are advantageously provided from the electrical supply of the respective drive and/or with the aid of an encoder.

The industrial plant advantageously comprises a controller for the first part and/or the second part of the plant. The controller is advantageously configured as a control station.

The invention will be described and discussed in more detail below on the basis of figures. The embodiments shown in the figures are merely exemplary and do not in any way limit the invention.

BRIEF DESCRIPTION OF THE DRAWINGS

In the figures.

DETAILED DESCRIPTION OF INVENTION

Figure 1:
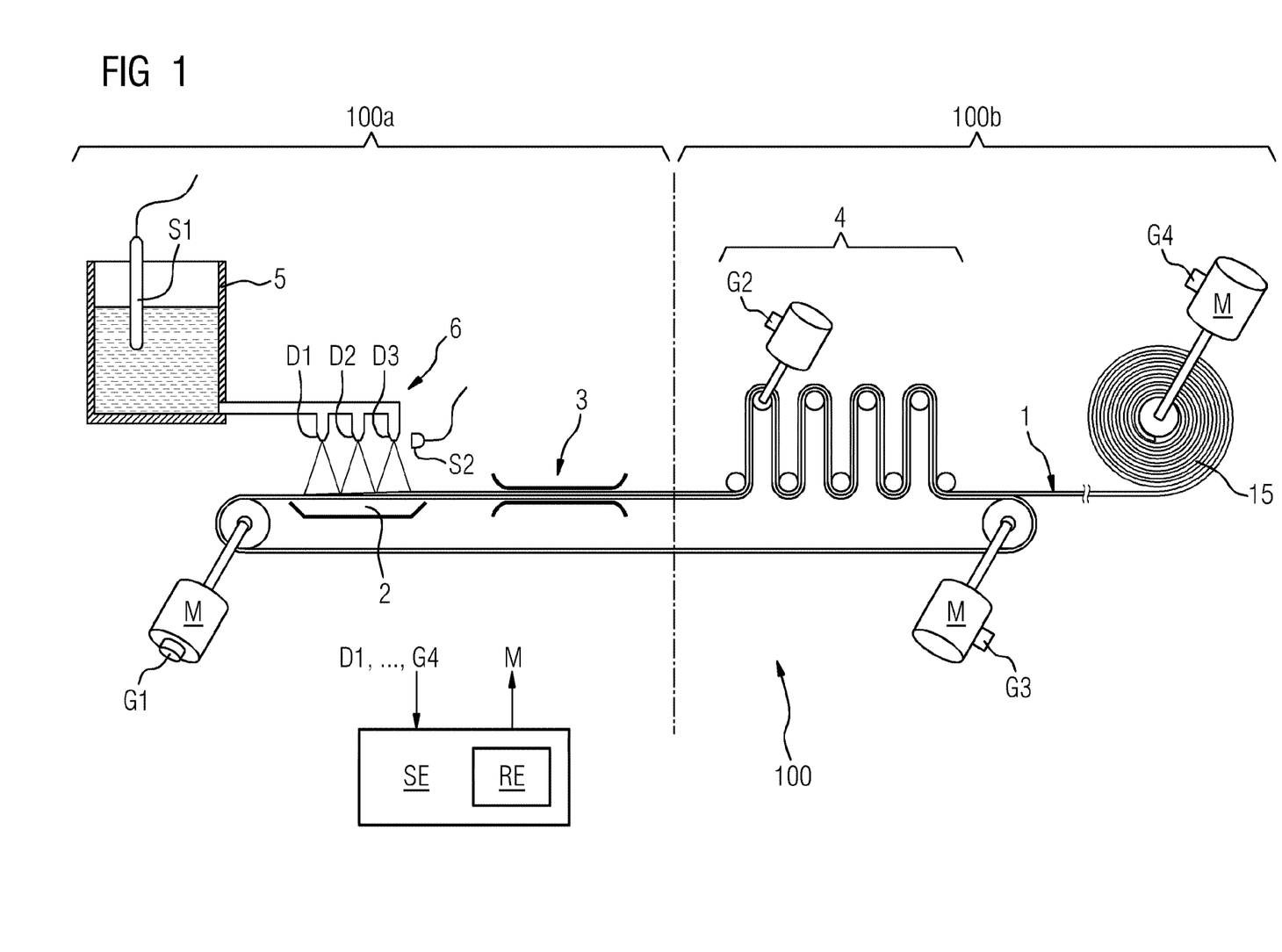
FIG. 1 shows an industrial plant.

FIG. 1 shows an industrial plant 100. The industrial plant comprises a first part 100a and a second part 100b. The first part 100a is configured as a wet part. The first part comprises a vessel 5. The vessel 5 serves for providing a fibrous solution. The fibrous solution is provided via pipes 6 to a multiplicity of nozzles D1, D2, D3. The respective nozzle D1, D2, D3 serves for applying the fibrous solution to a wire section 2. The wire section serves for separating the fibers from the solution. The fibers are provided in the form of a fiber mat to a press section 3. The press section 3 forms the fibrous material web 1. The fibrous material web is provided to the second part 100b of the industrial plant 100.

The second part 100b is configured as a dry section 4. The dry section comprises a multiplicity of rollers, wherein the respective roller is coupled to a drive M.

At least some of the drives M are coupled to an encoder G1, ..., G4. The respective encoder G1, ..., G4 serves for acquiring the respective rotational speed of the respective drive M.

The fibrous material web 1 passes through the dry section and is rolled up on a roller 15. A control device SE serves for controlling the respective drive M. The control device SE serves for the open-loop or closed-loop control of the respective torque and/or of the respective rotational speed of the respective drive M.

The control device advantageously comprises a closed-loop control device RE. The closed-loop control device RE serves for the closed-loop control of first parameters x1, ..., xn and/or second parameters y1, ..., yn.

A first parameter x1, ..., xn may be the opening of the respective nozzle D1, D2, D3, a temperature of the fibrous solution or the pressure of the fibrous solution in the pipes 6.

A second parameter y1, ..., yn is advantageously a temperature in the dry section 4, a torque of a drive M or a rotational speed of a drive M.

Exemplary functioning of the industrial plant 100: the fibrous solution is sprayed by the respective nozzle D1, D2, D3 onto a fiber mat. The fiber mat with the fibers is fed to a press section 3. The press section 3 serves for forming the fibrous material web 1. The fibrous material web is subsequently dried in the dry section 4. In the dry section 4, the fibrous material web 1 runs over the multiplicity of rollers and is dried further. In the dry section, a web break can occur in the event of a high tensile load, that is to say a high web tension B, of the fibrous material web 1.

In the event of a web break, the industrial plant is generally stopped, and a fault is eliminated manually.

Figure 3:
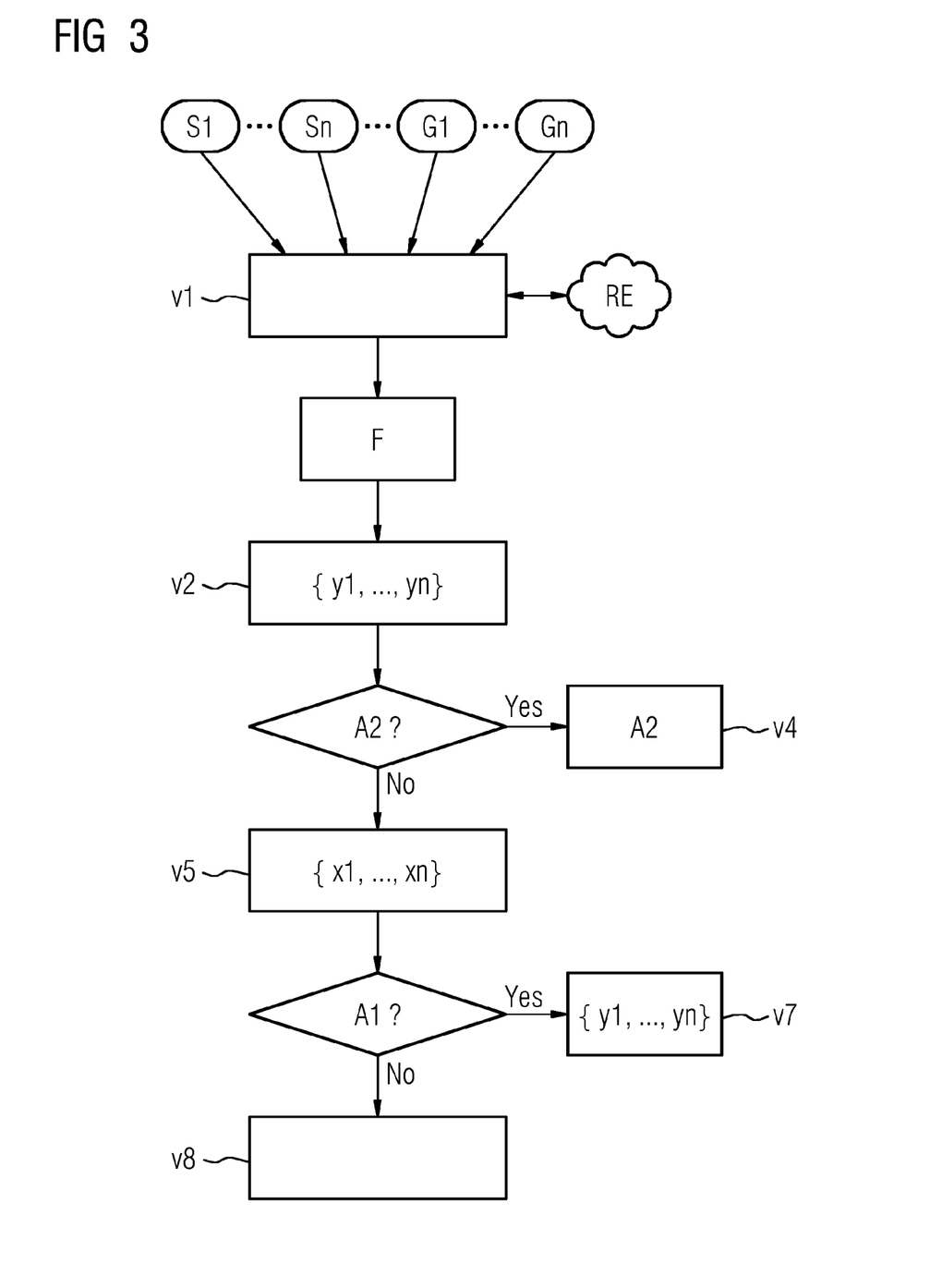
FIG. 3 shows a possible method.

In order to avoid further web breaks, an evident reason for the web break is ascertained by means of the following exemplary method (see FIG. 3).

Figure 2:
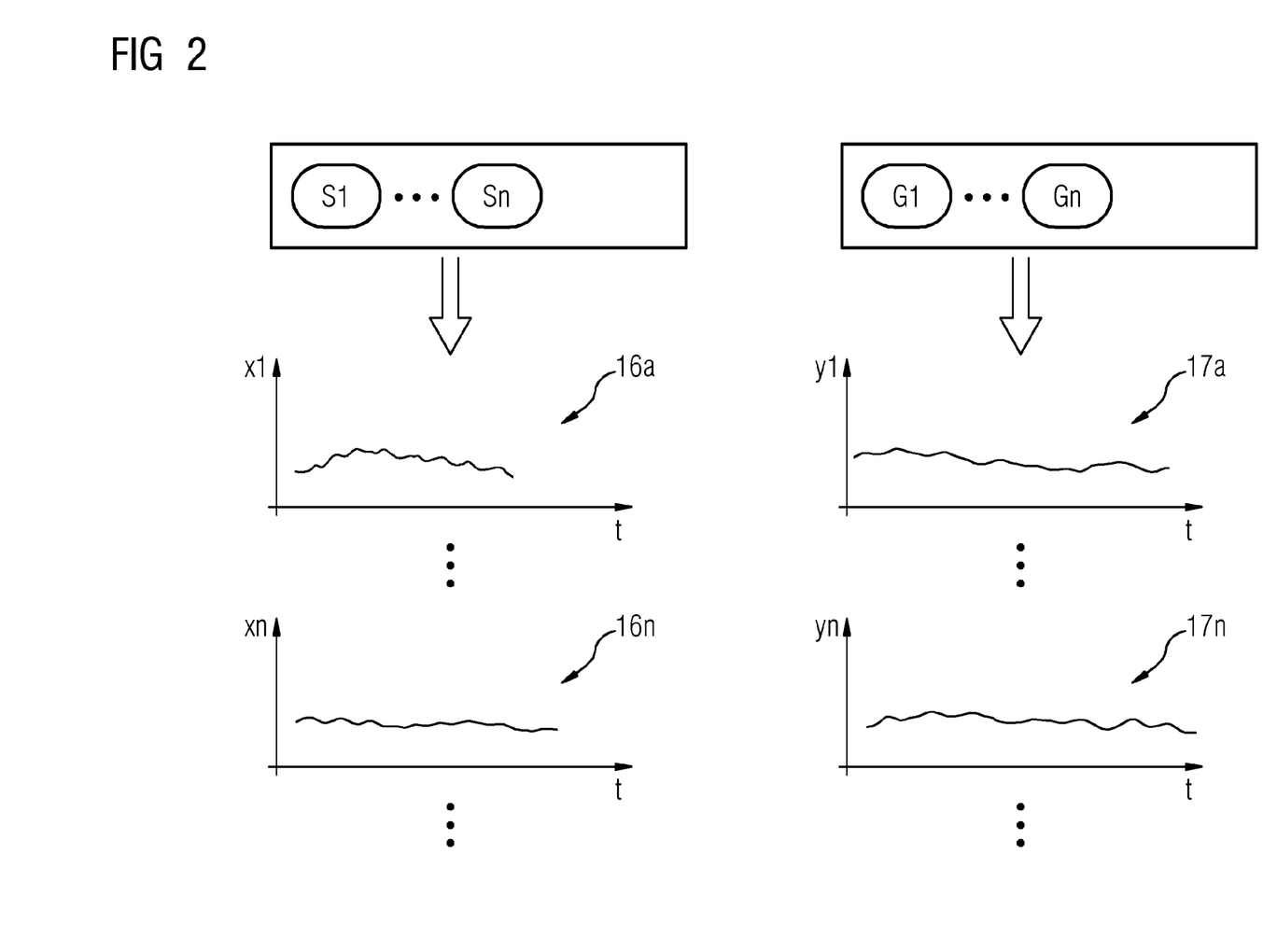
FIG. 2 shows sensors, encoders and time series.

FIG. 2 shows sensors S1, ... Sn, encoders G1, ..., Gn and time series 16a, ..., 16n, 17a, ... 17n. The sensors S1, ..., Sn advantageously provide first parameters x1, ..., xn. The encoders G1, ..., Gn are advantageously respectively assigned to a drive M and/or to a roller. The respective encoder G1, ..., Gn generally provides second parameters y1, ..., yn.

The first parameters x1, ..., xn and the second parameters y1, ..., yn are stored as a function of the time t. Advantageously, the parameters x1, ..., xn, y1, ..., yn are stored in time series 16a, ... 16n (for first parameters), 17a, ..., 17n (for second parameters).

Storage is advantageously performed in a data memory. The data memory is advantageously configured as a cloud.

FIG. 3 shows a possible method. The possible method comprises a multiplicity of method steps v1, ..., v8, as discussed below.

In a first method step v1, the first parameters x1, ..., xn and/or second parameters y1, ..., yn are ascertained by sensors S1, ..., Sn and/or encoders G1, ..., Gn and are stored. Storage is advantageously performed by storage in a processing unit RE. The processing unit RE may be configured as a so-called edge device and/or as a peripheral server, in particular as a cloud.

The parameters x1, ... xn, y1, ..., yn are advantageously stored as time series 16a, ... 16n, 17a, ..., 17n. A timestamp, such as the time of day, advantageously serves for the synchronization of the individual time series 16a, ..., 17n.

If a web break F is observed, the second method step V2, and advantageously the further method steps v3, ..., v8, are performed.

In the second method step v2, the second parameters y1, ..., yn are analyzed. It is advantageously the case here that the respective web tension is provided from the rotational speeds and/or the torques of the respective drive M.

In a third method step v3, the at least one provided web tension is inspected as regards whether a maximum web tension B-max has been overshot. In the event of the maximum web tension B-max being overshot, the reason for the web break F probably lies in the dry section.

In a fourth method step v4, the overshooting of the maximum web tension B-max is displayed to a user. Furthermore, possibilities can be displayed to the user, by means of which measures web breaks F can be prevented in future.

Alternatively or in addition, as part of the fourth method step v4, the respective drives M may be controlled in open-loop or closed-loop fashion such that a web break F of said type no longer occurs.

If the analysis of the second parameters yields that no second anomaly has occurred in the second parameters, then an analysis of the first parameters x1, ..., xn is performed in a fifth method step v5. Advantageously, in the fifth method step v5, the first parameters x1, ..., xn are checked for a first anomaly.

If a first anomaly is observed, the anomaly may be displayed to a user. Measures for eliminating the anomaly may advantageously be displayed to the user. By way of example, such measures may include cleaning a nozzle D1, D2, D3. Alternatively, first parameters x1, ..., xn may be changed such that the first anomaly is eliminated. A brief temperature increase or a brief pressure increase is for example conceivable here.

Alternatively or in addition, in the presence of the first anomaly, in a seventh method step v7, the second parameters y1, ..., yn may be set such that a second anomaly will likely not occur. For example, for this purpose, the rotational speeds and/or the torques of the respective drives are set such that the web tension B is reduced at least in certain regions.

In an eighth method step v8, it is also possible for a manual analysis of the first parameters x1, ..., xn and/or of the second parameters y1, ..., yn to be performed. This analysis is performed for example with the aid of artificial intelligence. By means of such an analysis, it is advantageously possible to identify patterns that arise prior to a web break. By means of the analysis, it is possible to identify factors in the industrial plant 100 for achieving higher operational reliability of the industrial plant.

In summary, the invention relates to a method for monitoring an industrial plant 100, to a computer program product and to an industrial plant 100. The industrial plant 100 comprises two parts 100a, 100b. The industrial plant 100, configured in particular as a paper machine, serves for producing and/or for processing a fibrous material web 1. In a first part 100a of the industrial plant 100, in particular of a paper machine, first parameters $x1, \ldots, xn$ are provided. In a second part 100b, second parameters $y1, \ldots, yn$ are provided. The parameters $x1, \ldots, xn, y1, \ldots, yn$ are advantageously stored as time series $16a, \ldots, 16n, 17a, \ldots, 17n$. In the event of a web break in the second part 100b, it is firstly the case that an analysis of the second parameters $y1, \ldots, yn$ for a second anomaly is performed. If no second anomaly can be observed, the first parameters $x1, \ldots, xn$ are inspected for a first anomaly. In the analysis, it is advantageously the case that the parameters $x1, \ldots, yn$ that were stored in a time range preceding the web break F are inspected. If a first or second anomaly is observed, this, and optionally measures for avoiding such web breaks F, are displayed to the user. The first parameters $x1, \ldots, xn$ and/or the second parameters $y1, \ldots, yn$ may optionally be set such that web breaks F are avoided in future.

The invention claimed is:

1. A method for monitoring and controlling an industrial plant for reducing a risk of a web break of a fibrous material web, wherein the industrial plant serves for producing and/or processing the fibrous material web, wherein the industrial plant comprises a first part configured as a wet part, and a second part configured as a dry section, wherein the method comprises:
    operating at least one of sensors and encoders to determine first parameters of the first part and to determine second parameters of the second part,
    storing the first parameters and/or the second parameters in at least one of a data memory and cloud storage as a function of time,
    analyzing the first and second parameters by a processing unit to determine anomalies that lead to web breaks based on deviations of the parameters beyond a tolerance and/or changes in the parameters as a function of time,
    wherein the second parameters are analyzed first for second anomalies and
    when a second anomaly is determined, a controller sends signals to adapt the second parameters to reduce the risk of the web break;
    when no second anomaly is determined, but a first anomaly is determined, the first anomaly is displayed to a user and the controller sends signals to adapt the first parameters and/or the second parameters to reduce the risk of the web break;
    wherein adapting the first parameters comprises increasing/decreasing the first parameters comprising at least one of a temperature of the fibrous material web, a concentration of fibers in the fibrous material web, and a pH value of the fibrous material web,
    wherein adapting the second parameters comprises increasing/decreasing the second parameters comprising at least one of rotational speeds and torques of a respective drive in the dry section, and a web tension between two rollers.

2. The method as claimed in claim 1,
wherein the analysis of the first parameters and/or of the second parameters is performed after a web break of the fibrous material web.

3. The method as claimed in claim 1,
wherein, when the first anomaly of the first parameters or the second anomaly of the second parameters is observed, a change of the second parameters is performed such that the web tension of the fibrous material web is reduced.

4. The method as claimed in claim 1,
wherein, when the first anomaly of the first parameters is observed, a change of the first parameters is performed such that a maximum tension assumes a sufficiently high value such that no web break occurs in the case of correct functioning of the second part.

5. The method as claimed in claim 1,
wherein the analysis of the second parameters comprises the following step:
comparing the web tension with a maximum tension,
wherein the second anomaly is present if the web tension overshoots the maximum tension.

6. The method as claimed in claim 4,
wherein the maximum tension is calculated on the basis of the first parameters.

7. The method as claimed in claim 1,
wherein the respective first parameter and/or the respective second parameter are stored as a time series.

8. The method as claimed in claim 1,
wherein the respective first parameters and/or the respective second parameters are analyzed with the aid of an algorithm based on artificial intelligence.

9. The method as claimed in claim 1,
wherein, when the first anomaly and/or the second anomaly are/is determined, a possibility for avoiding the respective anomaly is displayed.

10. The method as claimed in claim 1,
wherein the stored first parameters and/or the stored second parameters serve for the adaptation of the algorithm that is based on artificial intelligence.

11. The method as claimed in claim 1,
wherein, in the event of a web break, the first parameters and/or the second parameters that lie in a time range preceding the web break are analyzed in order to identify a pattern, wherein, in the event of a later occurrence of such a pattern, a warning signal is output to the user.

12. A non-transitory computer readable medium comprising:
    computer program instructions stored therein for carrying out a method according to claim 1 when the computer program instructions are executed on a processing unit.

13. A device for monitoring an industrial plant, wherein the device comprises:
    a processing unit for receiving first parameters and/or second parameters and analyzing first parameters for a first anomaly and/or second parameters for a second anomaly based on deviations beyond a tolerance and/or changes in the parameters as a function of time,
    a controller for adjusting the first parameters and/or second parameters;
    optionally a display for interaction with a user, and an interface for the provision of settings for the industrial plant, wherein the device is configured for carrying out a method as claimed in claim 1.

14. An industrial plant, comprising:
a device as claimed in claim 13.

15. The industrial plant of claim 14, wherein the industrial plant comprises a paper machine.

\* \* \* \* \*